United States Patent

Gareiss et al.

Patent Number: 5,464,894
Date of Patent: Nov. 7, 1995

[54] FLAMEPROOFED THERMOPLASTIC POLYESTERS

[75] Inventors: Brigitte Gareiss, Ludwigshafen; Petra Baierweck, Boehl-Iggelheim; Christoph Plachetta, Limburgerhof; Karlheinz Ulmerich, Carlsberg, all of Germany

[73] Assignee: BASF Aktiengesellschaft, Ludwigshafen, Germany

[21] Appl. No.: 220,494

[22] Filed: Mar. 31, 1994

[30] Foreign Application Priority Data

Apr. 20, 1993 [DE] Germany ............ 43 12 751.7

[51] Int. Cl.$^6$ ............................................. C08K 3/26
[52] U.S. Cl. ................................... 524/424; 524/425
[58] Field of Search ........................ 524/424, 425; 528/274

[56] References Cited

U.S. PATENT DOCUMENTS 4,654,413  3/1987  Takahashi et al. ............. 528/274
5,298,547  3/1994  Gareiss et al. ................. 524/424

FOREIGN PATENT DOCUMENTS 186456  12/1984  European Pat. Off. .
207750  1/1987   European Pat. Off. .
543262  5/1993   European Pat. Off. .

OTHER PUBLICATIONS

Japanese Patent abstract of 63-210165 published Feb. 27, 1987.
Japanese Patent abstract of 53-104-650 published Feb. 24, 1977.

*Primary Examiner*—Veronica P. Hoke
*Attorney, Agent, or Firm*—Keil & Weinkauf

[57] ABSTRACT

Flameproofed thermoplastic molding materials are obtainable by mixing from 20 to 70% by weight of a mixture of carbonates of metals of the 2nd main group of the Periodic Table of Elements in a melt of from 10 to 80% by weight of a polyester prepolymer having a viscosity number of from 40 to 100 ml/g and subsequently carrying out solid-phase postcondensation.

4 Claims, No Drawings

FLAMEPROOFED THERMOPLASTIC POLYESTERS

The present invention relates to flameproofed thermoplastic molding materials obtainable by mixing A) from 20 to 70% by weight of a mixture of carbonates of metals of the 2nd main group of the Periodic Table of Elements
and
B) from 0 to 70% by weight of conventional additives and processing assistants
in a melt of
C) from 10 to 80% by weight of a polyester prepolymer having a viscosity number of from 40 to 100 ml/g
and subsequently carrying out solid-phase postcondensation.

The present invention furthermore relates to processes for the preparation of these thermoplastic molding materials, their use for the production of fibers, films and moldings, and moldings obtainable thereby.

Thermoplastic polyesters are used in many different areas, for example in the automotive sector, for the production of housings for electrical equipment or in the building sector.

For many applications, it is necessary for the thermoplastic polyester molding materials to be flameproofed.

For toxicological reasons, halogen-containing flameproofing agents are unsafe in production and processing. In case of fire, such flameproofing agents release corrosive hydrogen halides.

Conventional flameproofing agents, such as $Al(OH)_3$ or $Mg(OH)_2$, which do not adversely affect the light natural color of the molding materials are unsuitable for use in thermoplastic polyester molding materials. $Al(OH)_3$ is thermally unstable at the temperatures required for processing polyesters, so that water is eliminated as early as the mixing stage. When $Mg(OH)_2$ is used, the polyester compounds undergo cleavage during the processing, owing to the basicity of $Mg(OH)_2$, with the result that the viscosity is dramatically reduced.

EP-A 207 750 describes the use of magnesium carbonates as fillers and flameproofing agents in plastics. However, the flame-retardant effect due to $CO_2$ elimination is unsatisfactory.

Owing to their basicity, the mixtures described in Japanese Publication 53104-650 and comprising basic magnesium carbonate and hydrodulcite and the basic magnesium carbonates described in Japanese Publication 63210-165 are unsuitable as flameproofing agents for thermoplastic polyesters since, as in the case of $Mg(OH)_2$, they lead to the cleavage of polyester compounds.

Accordingly, the recent European Patent Application 92 119 257 proposes the use of mixtures of carbonates of metals of the 2nd main group as flameproofing agents for polyesters.

The large amounts of fillers required for adequate flameproofing lead to considerable problems during incorporation by means of conventional compounding methods. In particular, the melt foams as a result of the large amount of air introduced during incorporation, so that granules having a low bulk density are formed, ie. a lower weight of granules may be filled into bags of the same volume.

It is an object of the present invention to provide flameproofed thermoplastic polyester molding materials which have good flameproof properties and mechanical properties, in particular good impact strength. In particular, it is intended to avoid foaming of the extrudate to be granulated during incorporation of the large amounts of fillers, so that compact granules having a high bulk density can be obtained.

We have found that this object is achieved by the thermoplastic molding materials defined at the outset.

Preferred embodiments are described in the subclaims.

We have also found processes for the preparation of these thermoplastic molding materials, their use for the production of fibers, films and moldings, and the moldings obtainable thereby.

The novel molding materials contain, as component A), from 20 to 70, preferably from 30 to 60, and in particular from 40 to 55%, by weight of a mixture of carbonates of metals of the 2nd main group of the Periodic Table of Elements.

Mixtures of $a_1$) a magnesium calcium carbonate of the general formula $Mg_xCa_y(CO_3)_{x+y} \cdot m\, H_2O$, where x and y are each from 1 to 5, $x/y \geq 1$ and $m \geq 0$
and
$a_2$) a basic magnesium carbonate of the general formula $Mg_n(CO_3)_v(OH)_{2n-2v} \cdot w\, H_2O$ where n is from 1 to 6, v is greater than 0 and less than 6, $n/v>1$ and $w \geq 0$, have proven particularly suitable, the ratio of $a_1$) to $a_2$) being from 1:1 to 3:1.

The magnesium calcium carbonates $a_1$) may be either hydrated or anhydrous. The naturally occurring minerals, such as dolomite and huntite, are preferred.

An anhydrous form in which x is 3 and y is 1, $Mg_3Ca(CO_3)_4$ (huntite), is particularly preferred.

The basic magnesium carbonates $a_2$) may also be used in either hydrated or anhydrous form. Here too, the naturally occurring minerals, such as hydromagnesite, a hydrated compound where n is 5 and v and w are each 4, $Mg_5(CO_3)_4(OH)_2 \cdot 4H_2O$, are preferred.

The ratio $a_1$):$a_2$) is particularly preferably from 1:1 to 2:1.

The novel thermoplastic molding materials may contain, as component B), conventional additives and processing assistants, such as stabilizers, antioxidants, heat stabilizers and ultraviolet stabilizers, lubricants and mold release agents, colorants, such as dyes and pigments, fibrous and pulverulent fillers and reinforcing agents, rubbers (impact modifiers), nucleating agents, plasticizers, etc., the amount of which as a rule is not more than 70, preferably not more than 40%, by weight.

Examples of antioxidants and heat stabilizers are halides of metals of group I of the Periodic Table of Elements, for example sodium halides, potassium halides and/or lithium halides, if necessary in combination with copper(I) halides, for example chlorides, bromides or iodides, sterically hindered phenols, hydroquinones, aromatic secondary amines, such as diphenylamines, various substituted members of these groups and mixtures thereof, in concentrations up to 1% by weight, based on the weight of the thermoplastic molding materials.

Examples of UV stabilizers, which are used in general in amounts of up to 2% by weight, based on the molding material, are various substituted resorcinols, salicylates, benzotriazoles and benzophenones.

Organic dyes, such as nigrosine, and pigments, such as titanium dioxide, cadmium sulfide, cadmium selenide, phthalocyanines, ultramarine blue and carbon black, may also be added as colorants, as well as fibrous and particulate fillers and reinforcing agents. Examples of the latter are carbon fibers, glass fibers, amorphous silica, asbestos, calcium silicate (wollastonite), aluminum silicate, magnesium carbonate, kaolin, chalk, powdered quartz, mica and feldspar. The amount of such fillers and colorants is in general up to 50, preferably up to 35, in particular up to 25%, by weight.

Sodium phenyl phosphinate, alumina, silica, nylon 22 and, preferably, talc may be used as nucleating agents.

Lubricants and mold release agents, which are usually used in amounts of up to 1% by weight, are preferably long-chain fatty acids (e.g. stearic acid or behenic acid), salts thereof (e.g. calcium stearate or zinc stearate) or ester derivatives (e.g. stearyl stearate or pentaerythrityl tetrastearate) as well as amide derivatives (e.g. ethylenebisstearylamide).

Examples of plasticizers are dioctyl phthalate, dibenzyl phthalate, butyl benzyl phthalate, hydrocarbon oils, N-(n-butyl)benzenesulfonamide and o- and p-tolylethylsulfonamide.

The novel molding materials can furthermore contain from 0 to 2% by weight of fluorine-containing ethylene polymers. These polymers of ethylene have a fluorine content of from 55 to 76, preferably from 70 to 76%, by weight.

Examples of these are polytetrafluoroethylene (PTFE), tetrafluoroethylene/hexafluoroethylene copolymers or tetrafluoroethylene copolymers containing relatively small amounts (as a rule up to 50% by weight) of copolymerizable ethylenically unsaturated monomers. These are described, for example, by Schildknecht in Vinyl and Related Polymers, Wiley Publishers, 1952, pages 484 to 494, and by Wall in Fluoropolymers (Wiley Interscience, 1972).

These fluorine-containing ethylene polymers are homogeneously distributed in the molding materials and preferably have a particle size $d_{50}$ (number average) of from 0.05 to 10 μm, in particular from 0.1 to 5 μm. These small particle sizes can be achieved particularly preferably by using aqueous dispersions of fluorine-containing ethylene polymers and incorporating them into a polyester melt.

In order to improve the compatibility with the thermoplastic polyester, minerals and fillers may be treated with an adhesion promoter. Glycidyl-, vinyl- and aminoalkyltrialkoxysilanes are preferred.

The novel thermoplastic molding materials may furthermore contain from 0 to 60, preferably from 0 to 40%, by weight of a toughening polymer (also referred to below as elastomeric polymer or elastomer).

Preferred types of such elastomers are the ethylene/propylene (EPM) and ethylene/propylene/diene (EPDM) rubbers.

EPM rubbers have in general virtually no double bonds, whereas EPDM rubbers may have from 1 to 20 double bonds/100 carbon atoms.

Examples of diene monomers for EPDM rubbers are conjugated dienes, such as isoprene and butadiene, nonconjugated dienes of 5 to 25 carbon atoms, such as penta-1,4-diene, hexa-1,4-diene, hexa-1,5-diene, 2,5-dimethylhexa-1,5-diene and octa-1,4-diene, cyclic dienes, such as cyclopentadiene, cyclohexadienes, cyclooctadienes and dicyclopentadiene, and alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0.2.6]-3,8-decadiene, or mixtures thereof. Hexa-1,5-diene, 5-ethylidenenorbornene and dicyclopentadiene are preferred. The diene content of the EPDM rubbers is preferably from 0.5 to 50, in particular from 1 to 8%, by weight, based on the total weight of the rubber.

EPM and EPDM rubbers may preferably also be grafted with reactive carboxylic acids or derivatives thereof. Examples of these are acrylic acid, methacrylic acid and derivatives thereof, e.g. glycidyl (meth)acrylate and maleic anhydride.

A further group of preferred rubbers comprises copolymers of ethylene with acrylic acid and/or methacrylic acid and/or the esters of these acids. The rubbers may additionally contain dicarboxylic acids, such as maleic acid and fumaric acid, or derivatives of these acids, for example esters and anhydrides, and/or epoxy-containing monomers. These dicarboxylic acid derivatives or epoxy-containing monomers are preferably incorporated in the rubber by adding to the monomer mixture dicarboxylic acid derivatives or epoxy-containing monomers of the general formula I or II or III or IV

$$R^1C(COOR^2)=C(COOR^3)R^4 \quad (I)$$

(II)

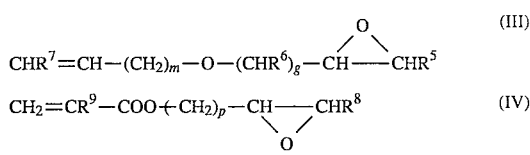

(III)

$$CH_2=CR^9-COO-(CH_2)_p-CH\underset{O}{\overset{}{\diagdown\!\!\diagup}}CHR^8 \quad (IV)$$

where $R^1$ to $R^9$ are each hydrogen or alkyl of 1 to 6 carbon atoms, m is an integer of from 0 to 20, g is an integer of from 0 to 10 and p is an integer of from 0 to 5.

$R^1$ to $R^9$ are each preferably hydrogen, m being 0 or 1 and g 1. The corresponding compounds are maleic acid, fumaric acid, maleic anhydride, allyl glycidyl ether and vinyl glycidyl ether.

Preferred compounds of the formulae I, II and IV are maleic acid, maleic anhdyride and epoxy-containing esters of acrylic acid and/or methacrylic acid, such as glycidyl acrylate, glycidyl methacrylate and the esters with tertiary alcohols, such as tert-butyl acrylate. Although the latter have no free carboxyl groups, they behave similarly to the free acids and are therefore referred to as monomers having latent carboxyl groups.

Advantageously, the copolymers consist of from 50 to 98% by weight of ethylene and from 0.1 to 20% by weight of epoxy-containing monomers and/or methacrylic acid and/or monomers containing anhydride groups, the remaining amount comprising (meth)acrylates.

Copolymers of from 50 to 98, in particular from 55 to 95%, by weight of ethylene, from 0.1 to 40, in particular from 0.3 to 20%, by weight of glycidyl acrylate and/or glycidyl methacrylate, (meth)acrylic acid and/or maleic anhydride and from 1 to 45, in particular from 10 to 40%, by weight of n-butyl acrylate and/or 2-ethylhexyl acrylate are particularly preferred.

Further preferred esters of acrylic and/or methacrylic acid are the methyl, ethyl, propyl, isobutyl and tert-butyl esters.

Vinyl esters and vinyl ethers may also be used as comonomers.

The ethylene copolymers described above can be prepared by processes known per se, preferably by random copolymerization under high pressure and at elevated temperatures. Corresponding processes are generally known.

Preferred elastomers include emulsion polymers, the preparation of which is described, for example, by Blackley in the monograph Emulsion Polymerization. The emulsifiers and catalysts which may be used are known per se.

In principle, homogeneous elastomers or those having a shell structure may be used. The shell-like structure is determined by the order of addition of the individual monomers; the morphology of the polymers is also influenced by this order of addition.

Acrylates, e.g. n-butyl acrylate and 2-ethylhexyl acrylate, corresponding methacrylates, butadiene and isoprene and mixtures thereof may be mentioned here merely as typical examples of monomers for the preparation of the rubber phase of the elastomers. These monomers may be copolymerized with further monomers, such as styrene, acrylonitrile, vinyl ethers and further acrylates or methacrylates, such as methyl methacrylate, methyl acrylate, ethyl acrylate and propyl acrylate.

The flexible or rubber phase (having a glass transition temperature below 0° C.) of the elastomers may constitute the core, the outer shell or a middle shell (in the case of elastomers having more than two shells); in the case of multishell elastomers, it is also possible for a plurality of shells to consist of a rubber phase.

If one or more rigid components (having glass transition temperatures of more than 20° C.) are also present in the elastomer in addition to the rubber phase, they are generally prepared by polymerization of styrene, acrylonitrile, methacrylonitrile, α-methylstyrene, p-methylstyrene, acrylates and methacrylates, such as methyl acrylate, ethyl acrylate and methyl methacrylate, as main monomers. Here too, smaller amounts of further comonomers may also be used.

In some cases, it has proven advantageous to use emulsion polymers which have reactive groups at the surface. Such groups are, for example, epoxy, carboxyl, latent carboxyl, amino or amido groups and functional groups which can be introduced by the concomitant use of monomers of the general formula

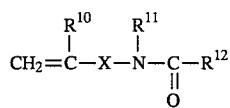

where
$R^{10}$ is hydrogen or $C_1$–$C_4$-alkyl,
$R^{11}$ is hydrogen, $C_1$–$C_8$-alkyl or aryl, in particular phenyl,
$R^{12}$ is hydrogen, $C_1$–$C_{10}$-alkyl, $C_6$–$C_{12}$-aryl or —$OR^{13}$,
$R^{13}$ is a $C_1$–$C_8$-alkyl or $C_6$–$C_{12}$-aryl group which may be substituted by O- or N-containing groups,
X is a chemical bond, $C_1$–$C_{10}$-alkylene, $C_6$–$C_{12}$-arylene or

Y is O—Z or NH—Z and
Z is $C_1$–$C_{10}$-alkylene or $C_6$–$C_{12}$-arylene.

The graft monomers described in EP-A 208 187 are also suitable for introducing reactive groups at the surface.

Further examples are acrylamide, methacrylamide and substituted esters of acrylic acid or methacrylic acid, such as (N-tert-butylamino)-ethyl methacrylate, (N,N-dimethylamino)-ethyl acrylate, (N,N-dimethylamino)-methyl acrylate and (N,N-diethylamino)-ethyl acrylate.

The particles of the rubber phase may also be crosslinked. Examples of monomers having a crosslinking action are buta-1,3-diene, divinylbenzene, diallyl phthalate and dihydrodicyclopentadienyl acrylate, as well as the compounds described in EP-A 50 265.

Graft-linking monomers, ie. monomers having two or more polymerizable double bonds which react at different rates during the polymerization, may also be used. Preferably used compounds are those in which at least one reactive group polymerizes at about the same rate as the remaining monomers while the other reactive group (or reactive groups) polymerizes (polymerize), for example, substantially more slowly. The different polymerization rates result in a certain proportion of unsaturated double bonds being introduced into the rubber. If a further phase is subsequently grafted onto such a rubber, some or all of the double bonds present in the rubber react with the graft monomers with formation of chemical bonds, ie. the phase grafted on is partially or completely linked to the grafting base via chemical bonds.

Examples of such graft-linking monomers are allyl-containing monomers, in particular allyl esters of ethylenically unsaturated carboxylic acids, such as allyl acrylate, allyl methacrylate, diallyl maleate, diallyl fumarate, diallyl itaconate and the corresponding monoallyl compounds of these dicarboxylic acids. There is also a large number of further suitable graft-linking monomers; for further details, reference may be made, for example, to U.S. Pat. No. 4,148,846.

In general, the amount of these crosslinking monomers in the toughening polymer is up to 5, preferably not more than 3%, by weight, based on the toughening polymer.

Some preferred emulsion polymers are listed below. First, graft polymers having a core and at least one outer shell may be mentioned here, said polymers having the following composition:

| Type | Monomers for the core | Monomers for the shell |
|---|---|---|
| I | buta-1,3-diene, isoprene, n-butyl acrylate, ethylhexyl acrylate or mixtures thereof | styrene, acrylonitrile, Methyl methacrylate |
| II | as for I but with the concomitant use of crosslinking agents | as for I |
| III | as for I or II | n-butyl acrylate, ethyl acrylate, methyl acrylate, buta-1,3-diene, isoprene, ethylhexyl acrylate |
| IV | as for I or II | as for I or III but with the concomitant use of monomers having reactive groups as described herein |
| V | styrene, acrylonitrile, methyl methacrylate or mixtures thereof | first shell comprising monomers as described under I and II for the core second shell as described under I or IV for the shell |

Instead of graft polymers having a multishell structure, it is also possible to use homogeneous, ie. single-shell, elastomers of buta-1,3-diene, isoprene and n-butyl acrylate or copolymers thereof. These products too can be prepared by the concomitant use of crosslinking monomers or monomers having reactive groups.

Examples of preferred emulsion polymers are n-butyl acrylate/(meth)acrylic acid copolymers, n-butyl acrylate/ glycidyl acrylate or n-butyl acrylate/glycidyl methacrylate copolymers, graft polymers having an inner core of n-butyl acrylate or based on butadiene and an outer shell of the abovementioned copolymers and copolymers of ethylene with comonomers which donate reactive groups.

The elastomers described may also be prepared by other conventional methods, for example by suspension polymerization.

Further preferred rubbers are polyurethanes, as described in EP-A 115 846, EP-A 115 847, EP-A 116 456, EP-A 117 664 and EP-A 327 384. Such products are commercially available, for example, under the names Desmopan® (Bayer AG) or Elastollan® (Elastogran Polyurethane GmbH).

Silicone rubbers, as described in DE-A 37 25 576, EP-A 235 690, DE-A 38 00 603 and EP-A 319 290, are also preferred.

It is of course also possible to use mixtures of the abovementioned types of rubbers.

The novel thermoplastic molding materials contain, as component C), from 10 to 80, preferably from 20 to 70, in particular from 25 to 60%, by weight of a polyester prepolymer having a viscosity number of from 40 to 100, preferably from 60 to 100, in partiuclar from 80 to 100, ml/g, measured in a 0.5% strength solution in a 1:1 o-dichlorobenzene/phenol solvent mixture at 25° C.

Such polyesters are known per se. Polyesters which contain an aromatic ring in the main chain are preferably used. The aromatic ring may also be substituted, for example by halogens, such as chlorine and bromine, and/or by $C_1$–$C_4$-alkyl, e.g. methyl, ethyl, isopropyl, n-propyl, isobutyl, n-butyl or tert-butyl.

Examples of suitable dicarboxylic acids are aliphatic and aromatic dicarboxylic acids, which may also be used in the form of a mixture. Naphthalenedicarboxylic acids, terephthalic acid, isophthalic acid, adipic acid, azelaic acid, sebacic acid, dodecanedioic acid and cyclohexanedicarboxylic acids, mixtures of these carboxylic acids and ester-forming derivatives thereof may be mentioned here merely by way of example.

Preferably used dihydroxy compounds are diols of 2 to 10 carbon atoms, particularly preferably ethylene glycol, 1,3-propanediol, 1,4-butanediol, 1,4-butenediol and 1,6-hexanediol; however, it is also possible to use 1,4-hexanediol, 1,4-cyclohexanediol, 1,4-di-(hydroxymethyl)-cyclohexane, bisphenol A, neopentyl glycol, mixtures of these diols and ester-forming derivatives thereof.

Polyesters of terephthalic acid or naphthalenedicarboxylic acids and a $C_2$–$C_6$-diol component, e.g. polyethylene terephthalate, polyethylene naphthalate, polypropylene terephthalate or polybutylene terephthalate, or mixtures thereof are particularly preferred.

It is of course also possible to use polyester block copolymers, such as copolyetheresters. Such products are known per se and are described in the literature, for example in U.S. Pat. No. 3,651,014. Corresponding products are also commercially available, for example Hytrel® (Du Pont).

The polyester prepolymers can be prepared by reacting dicarboxylic acids, esters thereof or other ester-forming derivatives with dihydroxy compounds in a manner known per se, either batchwise or continuously (cf. for example European Patent 346,735, continuous preparation).

The polyester prepolymer obtainable in a conventional manner is removed continuously from the condensation zone.

In a preferred procedure, the polyester prepolymer is passed in the form of a melt through a discharge zone. The melt is extruded and the extrudate is granulated. The granules obtained (component C) are melted at about 20° C. above the melting point of component C) (in the case of polybutylene terephthalate at about 240° C.), preferably in a twin-screw extruder, mixed with the flameproofing agent (component A) and, if required, component B) and extruded, and the extrudate is cooled and granulated.

In a particularly preferred embodiment, the polyester prepolymer is passed through a discharge extruder, components A) and, if required, B) being mixed in. In this case, the discharge extruder is equipped with suitable mixing elements, such as kneaders. Thereafter, extrusion is likewise carried out, and the extrudate is cooled and granulated.

These granules are subjected to continuous or batchwise solid-phase condensation under an inert gas at below the melting point, for example at from 170° to 220° C., until the desired viscosity is obtained. For example, tumbling dryers may be used for the batchwise solid-phase condensation, and heating tubes through which hot inert gas flows may be used for the continuous solid-phase condensation. The continuous solid-phase condensation is preferred, the inert gas employed preferably being nitrogen.

After the solid-phase postcondensation, the viscosity number, measured in a 0.5% strength by weight solution in 1:1 o-dichlorobenzene/phenol at 25° C., is generally from 120 to 500, preferably from 130 to 200, ml/g.

The novel molding materials have good flameproof properties and mechanical properties. In particular, foaming of the extrudate to be granulated is considerably reduced during incorporation of the large amounts of fillers, so that compact granules having a high bulk density are formed.

EXAMPLES

Example 1

A polybutylene terephthalate prepolymer having a viscosity number of 100 ml/g (measure in a 0.5% strength by weight solution in phenol/o-dichlorobenzene (weight ratio 1:1)) (Ultradur® B 2550 from BASF AG) (component C)) was mixed with a mixture of $Mg_3Ca(CO_3)_4$ (huntite) and $Mg_5(CO_3)_4(OH)_2.4H_2O$ (hydromagnesite) (weight ratio of huntite to hydromagnesite=2:1) (component A)) and cut glass fibers treated with an epoxysilane and having an average fiber diameter of 10 μm (component B) in a twin-screw extruder (ZSK 53 from Werner & Pfleiderer) at 250° C. (30 kg/h throughput, 140 rpm), and the mixture was extruded, cooled and granulated.

The product was subjected to postcondensation under nitrogen at 215° C. in a tumbling mixer until a viscosity number shown in the Table was obtained.

Comparative Example 1

Polybutylene terephthalate having a viscosity number of 135 ml/g (Ultradur® B 4500 from BASF AG; component C/1V) and components A to C described in Example 1 were mixed in a conventional manner in a twin-screw extruder (ZSK 53 from Werner & Pfleiderer) at 250° C., and the mixture was compounded.

Standard test specimens were produced in an injection molding machine at 260° C.

The compositions and the properties are summarized in the Table.

The viscosity number VN was determined in a 0.5% strength by weight solution in phenol/o-dichlorobenzene (weight ratio 1:1). The modulus of elasticity was determined according to DIN 53 457 and the impact strength $a_n$ according to DIN 53 453.

The flameproof test was carried out by the vertical fire test (UL 94) according to the specifications of the Underwriter Laboratories. The test specimens used were fire bars having a thickness of 1/32".

The bulk density was determined after mechanical shaking of the granules, by weighing 1 l of granules.

TABLE

| Example | Composition [% by weight] | VN after compounding [ml/g] | VN after heating [ml/g] | UL 94 1/32" | $a_n$ [KJ/m²] | Bulk density [g/l] |
|---|---|---|---|---|---|---|
| 1 | 45 A 10 B 45 C | 100 | 135 | V-0 | 24 | 850 |
| 1V | 45 A 10 B 45 C/1V | 121 | — | V-2 | 10 | 450 |

We claim:

1. A flameproofed thermoplastic molding material, obtainable by mixing
    A) from 20 to 70% by weight of a mixture of carbonates of metals of the 2nd main group of the Periodic Table of Elements
and
    B) from 0 to 70% by weight of conventional additives and processing assistants
in a melt of
    C) from 10 to 80% by weight of a polyester prepolymer having a viscosity number of from 40 to 100 ml/g
and subsequently carrying out solid-phase postcondensation.

2. A flameproofed thermoplastic molding material as claimed in claim 1, wherein the polyester has a viscosity number of at least 120 ml/g after the solid-phase postcondensation.

3. A flameproofed thermoplastic molding material as claimed in claim 1, wherein a mixture of
    $a_1$) a magnesium calcium carbonate of the formula $Mg_xCa_y(CO_3)_{x+y} \cdot m\ H_2O$, where x and y are each from 1 to 5, $x/y \geq 1$ and $m \geq 0$
and
    $a_2$) a basic magnesium carbonate of the formula $Mg_n(CO_3)_v(OH)_{2n-2v} \cdot w\ H_2O$ where n is from 1 to 6, v is greater than 0 and less than 6, $n/v>1$ and $w \geq 0$,
is used as component A, the ratio of $a_1$) to $a_2$) being from 1:1 to 3:1.

4. A molding obtainable from a flameproofed thermoplastic molding material as claimed in claim 1.

* * * * *